United States Patent
Stoddard et al.

(10) Patent No.: US 8,103,726 B2
(45) Date of Patent: Jan. 24, 2012

(54) ANALYZING EMAIL CONTENT TO DETERMINE POTENTIAL INTENDED RECIPIENTS

(75) Inventors: William G. Stoddard, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 11/840,501

(22) Filed: Aug. 17, 2007

(65) Prior Publication Data
US 2009/0049140 A1 Feb. 19, 2009

(51) Int. Cl.
G06F 15/16 (2006.01)

(52) U.S. Cl. ....................................... 709/206

(58) Field of Classification Search .................. 709/206; 715/752
See application file for complete search history.

(56) References Cited

U.S. PATENT DOCUMENTS

| | | | |
|---|---|---|---|
| 6,205,472 B1* | 3/2001 | Gilmour | 709/206 |
| 6,385,627 B1 | 5/2002 | Cragun | |
| 7,529,756 B1* | 5/2009 | Haschart et al. | 1/1 |
| 2002/0060700 A1* | 5/2002 | Sone | 345/810 |
| 2002/0178228 A1* | 11/2002 | Goldberg | 709/206 |
| 2003/0023684 A1* | 1/2003 | Brown et al. | 709/204 |
| 2003/0105827 A1* | 6/2003 | Tan et al. | 709/206 |
| 2004/0114735 A1* | 6/2004 | Arning et al. | 379/93.24 |
| 2004/0135816 A1* | 7/2004 | Schwartz et al. | 345/811 |
| 2006/0026244 A1* | 2/2006 | Watson | 709/206 |
| 2007/0150426 A1* | 6/2007 | Asher et al. | 706/20 |

* cited by examiner

Primary Examiner — George Neurauter
Assistant Examiner — Sherman Lin
(74) Attorney, Agent, or Firm — DeLizio Gilliam, PLLC

(57) ABSTRACT

Described herein are processes and devices for analyzing email content to determine potential intended email recipients. One of the devices described is an email content analyzer device. The email content analyzer device can analyze content in a part of an email message that is not an email address recipient field. The email content analyzer device can obtain identifying information about a potential intended recipient of the email message, such as by looking for possible names of intended recipients within the body of the email message. The email content analyzer device can analyze the context of the identifying information in the content to determine the identity of the potential intended recipient. For example, the email content analyzer device can compare the identity of the potential intended recipient to an email addresses in an email address recipient field on the email message. The email content analyzer device can also determine whether the email message was intended for the potential intended recipient.

20 Claims, 10 Drawing Sheets

US 8,103,726 B2

ANALYZING EMAIL CONTENT TO DETERMINE POTENTIAL INTENDED RECIPIENTS

FIELD

Embodiments of the inventive subject matter relate generally to email systems, and more particularly to devices that analyze email content of email systems and networks.

BACKGROUND

Email applications allow people to communicate with each other rapidly and easily with written electronic messages. Currently, many email applications allow a user to send and receive a single email message to multiple recipients. However, some users would prefer email applications, systems, and networks that can do more. Consequently, some programmers have begun to build more powerful and more complex email applications.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into three sections. The first section describes example operating environments. The second section describes example operations performed by some embodiments. The third section presents some general comments.

Example Operating Environments

This section describes example operating environments and networks and presents structural aspects of some embodiments. More specifically, this section includes discussion about email content analyzer device networks, email content analyzer device architectures, email content analyzer computer systems, and email content analyzer device user settings displays.

Example Email Content Analyzer Device Network

Figure 1:
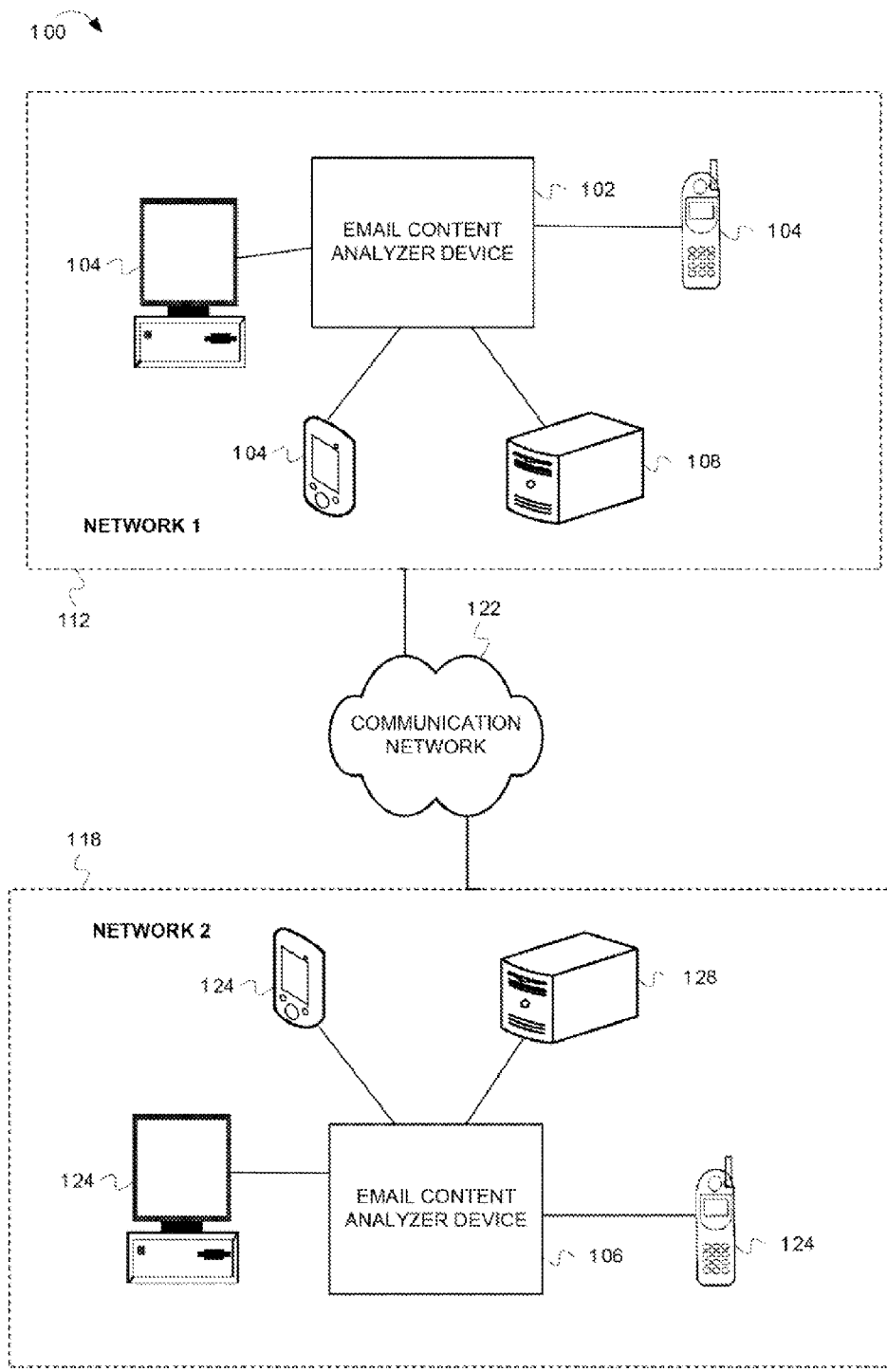
FIG. 1 is an illustration of an email content analyzer device 102 on a network 100, according to some embodiments of the invention.

FIG. 1 is an illustration of an email content analyzer device 102 on a network 100, according to some embodiments of the invention. In FIG. 1, the network 100, also referred to as an email content analyzer device network 100, includes a first local network 112 that includes network devices 104, 108, 124, 128 that can use the email content analyzer device 102. Example network devices 104, 108, 124, 128 include personal computers, personal digital assistants, mobile telephones, mainframes, minicomputers, laptops, servers, or the like. In FIG. 1, network devices 104, 124 can be client devices that can work in conjunction with servers 108, 128. Any one of these devices can be embodied as the computer system described in FIG. 3. A communications network 122 connects a second network 118 to the first network 112. The second local network 118 also includes devices 124 and a server 128 that can use the email content analyzer device.

FIG. 1 is an illustration of an email content analyzer device 102 on a network 100, according to some embodiments of the invention. In FIG. 1, the network 100, also referred to as an email content analyzer device network 100, includes a first local network 112 that includes network devices 104 and 108 that can use the email content analyzer device 102. Example network devices 104 and 108 can include personal computers, personal digital assistants, mobile telephones, mainframes, minicomputers, laptops, servers, or the like. In FIG. 1, network devices 104 can be client devices that can work in conjunction with a server 108. Any one of the network devices 104 and server 108 can be embodied as the computer system described in FIG. 3. A communications network 122 connects a second local network 118 to the first local network 112. The second local network 118 also includes network client devices 124 and a server device 128 that can use an email content analyzer device 106.

In some embodiments, the email content analyzer device 102 is configured to analyze email content to identify information about potential intended recipients. As will be shown below, content in portions of the email message that are not email address fields may be more helpful in determining an accurate recipient of an email than the actual email addresses in address fields. Consequently, it is beneficial for the email content analyzer device 102 to analyze email content, such as the body of an email, to ascertain who the potential intended recipients are based on the email content, not just from the email addresses presented in the email address fields.

Furthermore, in some embodiments, the email content analyzer device 102 is configured to compare the information about potential intended recipients against criteria, such as correspondence rules and settings, user rules and settings, email addresses in the email address fields, contact profile records, etc., to determine whether email was intended for a recipient. The email content analyzer device 102 could then determine whether the email addresses were properly positioned within the correct email address field. For instance, if a name in a greeting line of the email body does not match lip with a name in the "To" field, but rather matches up with a recipient in the "CC" field, then likely the recipient is probably misplaced in the wrong email address field.

The email content analyzer device 102, is also configured to indicate that the email message was intended for a potential intended recipient. For example, the email content analyzer device 102 can warn the user that the email recipients are mismatched, misplaced, not found, etc. The email content analyzer device 102 can also propose a possible plan of action. For example, the email content analyzer device 102 can propose possible rearrangement of email addresses. Further details of some embodiments will be described further below.

Still referring to FIG. 1, the communications network 112 can be a local area network (LAN) or a wide area network (WAN). The communications network 112 can include any suitable technology, such as Public Switched Telephone Network (PSTN), Ethernet, 302.11g, SONET, etc. For simplicity, the email content analyzer device network 100 shows only six client network client devices 104, 124 and two network server devices 108, 128 connected to the communications network 122. In practice, there may be a different number of clients and servers. Also, in some instances, a client may perform the functions of a server and a server may perform the functions of a client device. Additionally, the client devices 104, 124 can connect to the communications network 122 and exchange data with other devices in their respective networks 112, 118 or other networks (not shown).

Example Email Content Analyzer Device Architecture

Figure 2:
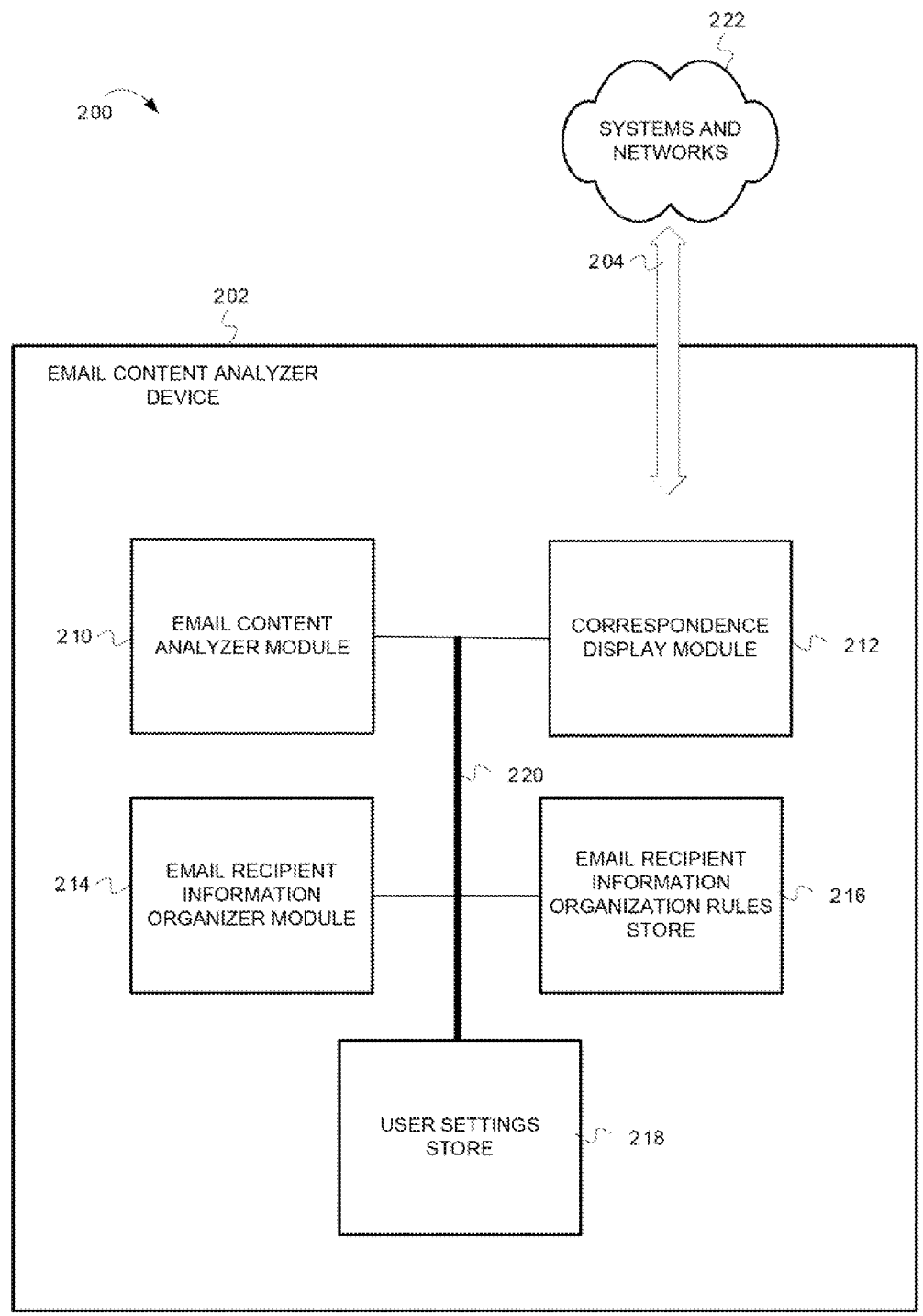
FIG. 2 is an illustration of an email content analyzer device architecture 200, according to some embodiments of the invention.

FIG. 2 is an illustration of an email content analyzer device architecture 200, according to some embodiments of the invention. In FIG. 2, the email content analyzer device architecture 200 includes an email content analyzer module 210 configured to analyze content of email messages to identify information about potential intended recipients. In some embodiments, based on the analysis of potential intended recipients, the email content analyzer module 210 can also determine if recipient email addresses are properly placed or misplaced in recipient email address fields. The email content analyzer module 210 can analyze both draft emails as well as received emails. Additionally, the email content analyzer module 210 is configured compare the information about potential intended recipients against criteria to determine whether email was intended for a recipient.

In FIG. 2, the email content analyzer device architecture 200 also includes a correspondence display module 212 configured to indicate that an email message was intended for a recipient. For example, in some embodiments, the correspondence display module 212 can warn of potentially misplaced recipient addresses in recipient email address fields on a draft email. In other embodiments, if there are no email addresses in recipient email address fields, such as for list emails, the correspondence display module 212 can show display other indicators based on user settings.

In FIG. 2, the email content analyzer device architecture 200 also includes an email recipient information organizer module 214 to reorganize email addresses in recipient fields on draft emails for potentially misplaced recipient addresses in recipient email address fields.

In FIG. 2, the email content analyzer device architecture 200 also includes an email recipient information organization rules store 216 configured to store rules to assist in the reorganization of email addresses in recipient fields on draft emails for potentially misplaced recipient addresses in recipient fields.

In FIG. 2, the email content analyzer device architecture 200 also includes a user settings store 218 configured to store user settings regarding potential indicators to display, organization of email addresses, or other settings related to analysis of email content.

The email content analyzer device 202 can interface with systems and networks 222 via an interface 204. The interface 204 can assist to interface with internal and external systems, or in other words, the email content analyzer device 202 can be integral to a device or system and communicate with that internal device or system through the interface 204. Likewise, the email content analyzer device 202 can interface with devices and systems that are external to any host or client devices that contain the email content analyzer device 202.

Example Email Content Analyzer Computer System

Figure 3:
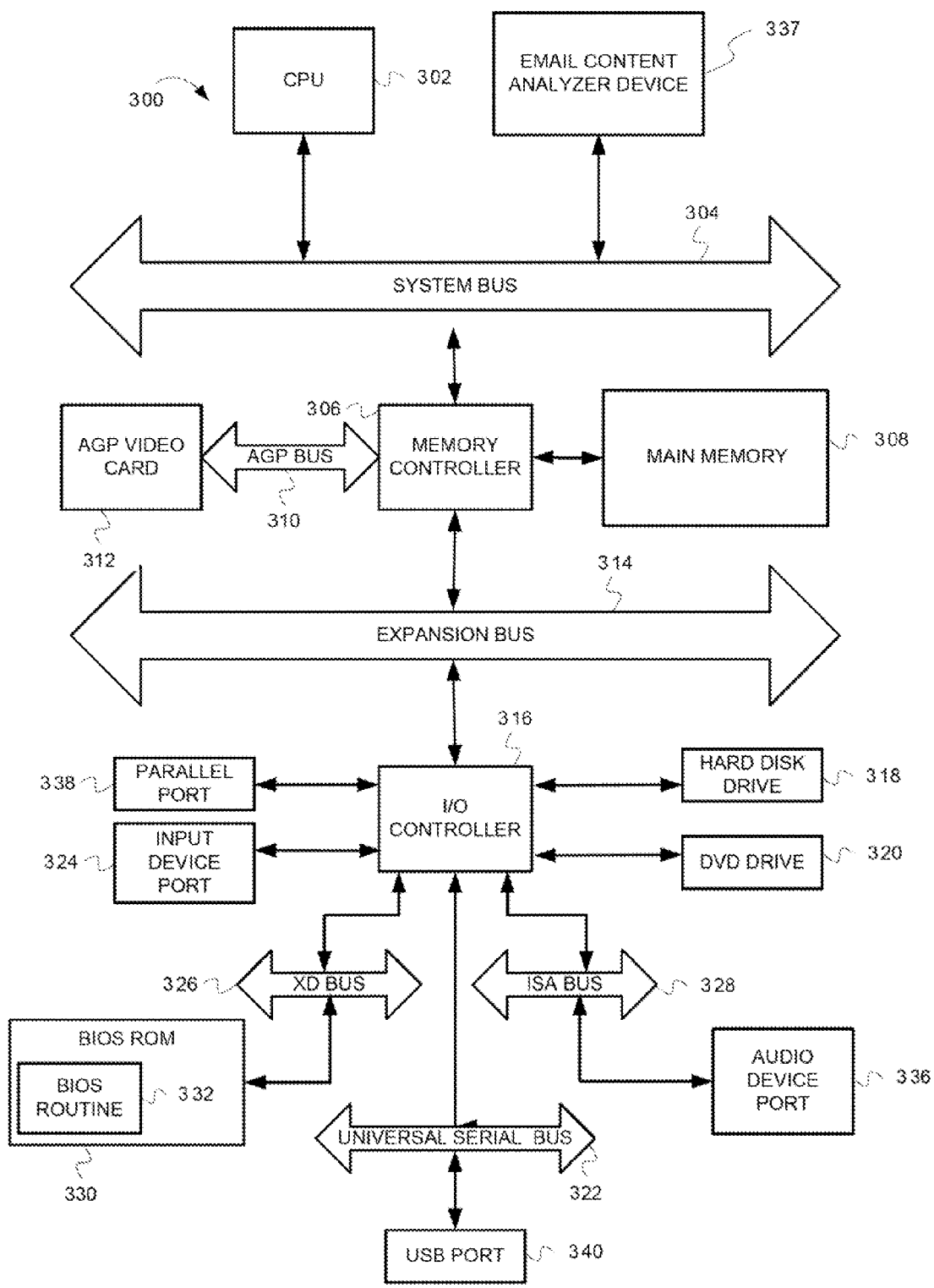
FIG. 3 is an illustration of an email content analyzer computer system 300, according to some embodiments of the invention.

FIG. 3 is an illustration of an email content analyzer computer system 300, according to some embodiments of the invention. In FIG. 3, the email content analyzer computer system 300 ("computer system") includes a CPU 302 connected to a system bus 304. The system bus 304 is connected to a memory controller 306 (also called a north bridge), which is connected to a main memory unit 308, AGP bus 310 and AGP video card 312. The main memory unit 308 can include any suitable memory, (e.g. ramdon access memory (RAM), synchronous dynamic RAM, extended data output RAM, etc.).

In one embodiment, the computer system 300 includes an email content analyzer device 337. The email content analyzer device 337 can process communications, commands, or other information, where the processing can analyze the content of an email message and determine potential intended recipients of the email message. The email content analyzer device 337 is shown connected to the system bus 304; however the email content analyzer device 337 could be connected to a different bus or device within the computer system 300. The email content analyzer device 337 can include software modules that utilize main memory 308.

An expansion bus 314 connects the memory controller 306 to an input/output (I/O) controller 316 (also called a south bridge). According to embodiments, the expansion bus 314 can be include a peripheral component interconnect (PCI) bus, PCIX bus, PC Card bus, CardBus bus, InfiniBand bus, or an industry standard architecture (ISA) bus, etc.

The I/O controller is connected to a hard disk drive (HDD) 318, digital versatile disk (DVD) 320, input device ports 324 (e.g., keyboard port, mouse port, and joystick port), parallel port 338, and a universal serial bus (USB) 322. The USB 322 is connected to a USB port 340. The I/O controller 316 is also connected to an XD bus 326 and an ISA bus 328. The ISA bus 328 is connected to an audio device port 336, while the XD bus 326 is connected to BIOS read only memory (ROM) 330.

In some embodiments, the computer system 300 can include additional peripheral devices and/or more than one of each component shown in FIG. 3. For example, in some embodiments, the computer system 300 can include multiple external multiple CPUs 302. In some embodiments, any of the components can be integrated or subdivided.

Any component of the computer system 300 can be implemented as hardware, firmware, and/or machine-readable media including instructions for performing the operations described herein.

Example Email Content Analyzer Device User Settings Display

Figure 4:
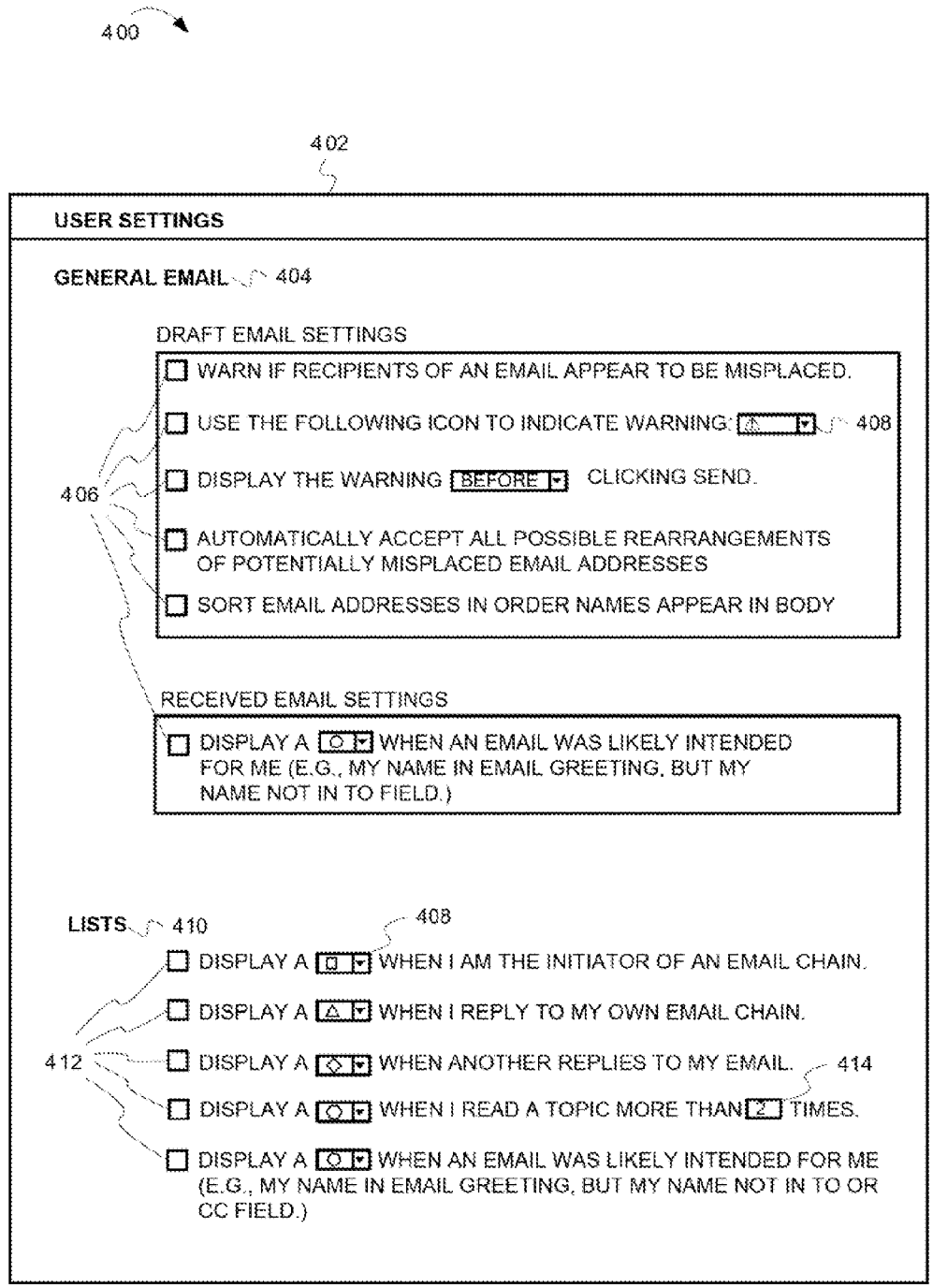
FIG. 4 is an illustration of an email content analyzer device user settings display 400, according to some embodiments of the invention.

FIG. 4 is an illustration of an email content analyzer device user settings display 400, according to some embodiments of the invention. In FIG. 4, the email content analyzer device user settings display 400 ("user settings display") includes a display interface 402 that allows a user to set settings that relate to an email content analyzer device. The user settings display 400 includes a first set of check box objects 406 that allows a user to set settings related to a first setting topic 404, such as general email settings. Email settings could be subdivided into settings that apply to different stages or types of email, such as "draft" email settings or "received" email settings. A second set of check box objects 412 can allow a user to set settings related to a second setting topic 410, such as "List" emails. The user settings display 400 may include custom settings, like dropdown objects 408 or fill-in objects 414.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 5:
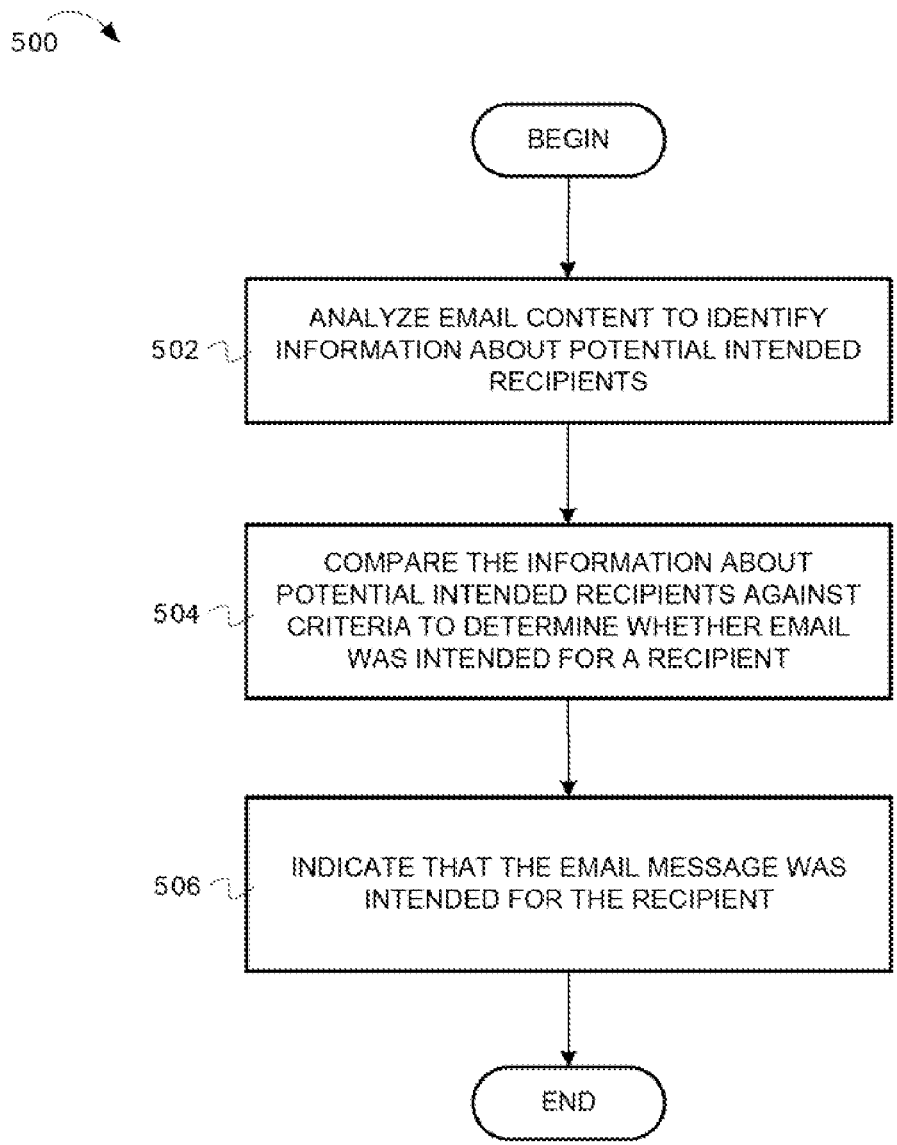
FIG. 5 is a flow diagram 500 illustrating analyzing email content to determine potential intended recipients, according to some embodiments of the invention.

FIG. 5 is a flow diagram illustrating analyzing email content to determine potential intended recipients, according to some embodiments of the invention. In FIG. 5, the flow 500 begins at processing block 502, where an email content analyzer device analyzes email content to identify information about potential intended recipients. Analyzing email content could include scanning the body, history, subject line, recipient and sender fields, originating sender, etc. of an email message. In some embodiments, the email content is specifically referring to information that is not in email address fields (e.g., the "To" field and the "CC" field). Content in portions of the email message that are not email address fields may be more helpful in determining an accurate recipient of an email than the actual email addresses in address fields. One reason is that email senders often reply to emails without paying proper attention to what recipients are in the different types of email address fields. For example, if a user replies to an email, an email application will do an exact copy of the email addresses in the direct email address fields (e.g., the "To" field) and in the carbon-copy email address fields (e.g., the "CC" field). However, sometimes the user that is replying to the email actually intends for the roles of the email recipients to change from direct to carbon-copy recipients, or vice versa. Consequently, it is beneficial for the email content analyzer device to analyze email content, such as the body of an email, to ascertain who the potential intended recipients are based on the email content, not just from the email addresses presented in the email address fields.

In FIG. 5, the flow 500 continues at processing block 504, where the email content analyzer device compares the information about potential intended recipients against criteria to determine whether email was intended for a recipient. Criteria could include correspondence rules and settings, user rules and settings, email addresses in the email address fields, contact profile records, etc., to determine whether email was intended for a recipient. For example, the email content analyzer device could compare names found in the body of the email message to the corresponding names of recipients that appear in email address fields. The email content analyzer device could then determine whether the email addresses were properly positioned within the correct email address field. For instance, if a name in a greeting line of the email body does not match up with a name in the "To" field, but rather matches up with a recipient in the "CC" field, then likely the recipient is probably misplaced in the wrong email address field.

In FIG. 5, the flow 500 continues at processing block 506, where the email content analyzer device indicates that the email message was intended for the recipient. The email content analyzer device can warn the user that the email recipients are mismatched, misplaced, not found, etc. The email content analyzer device can also propose a possible plan of action. For example, the email content analyzer device can propose possible rearrangements of email addresses. Further details of some embodiments will be described further below.

Figure 6:
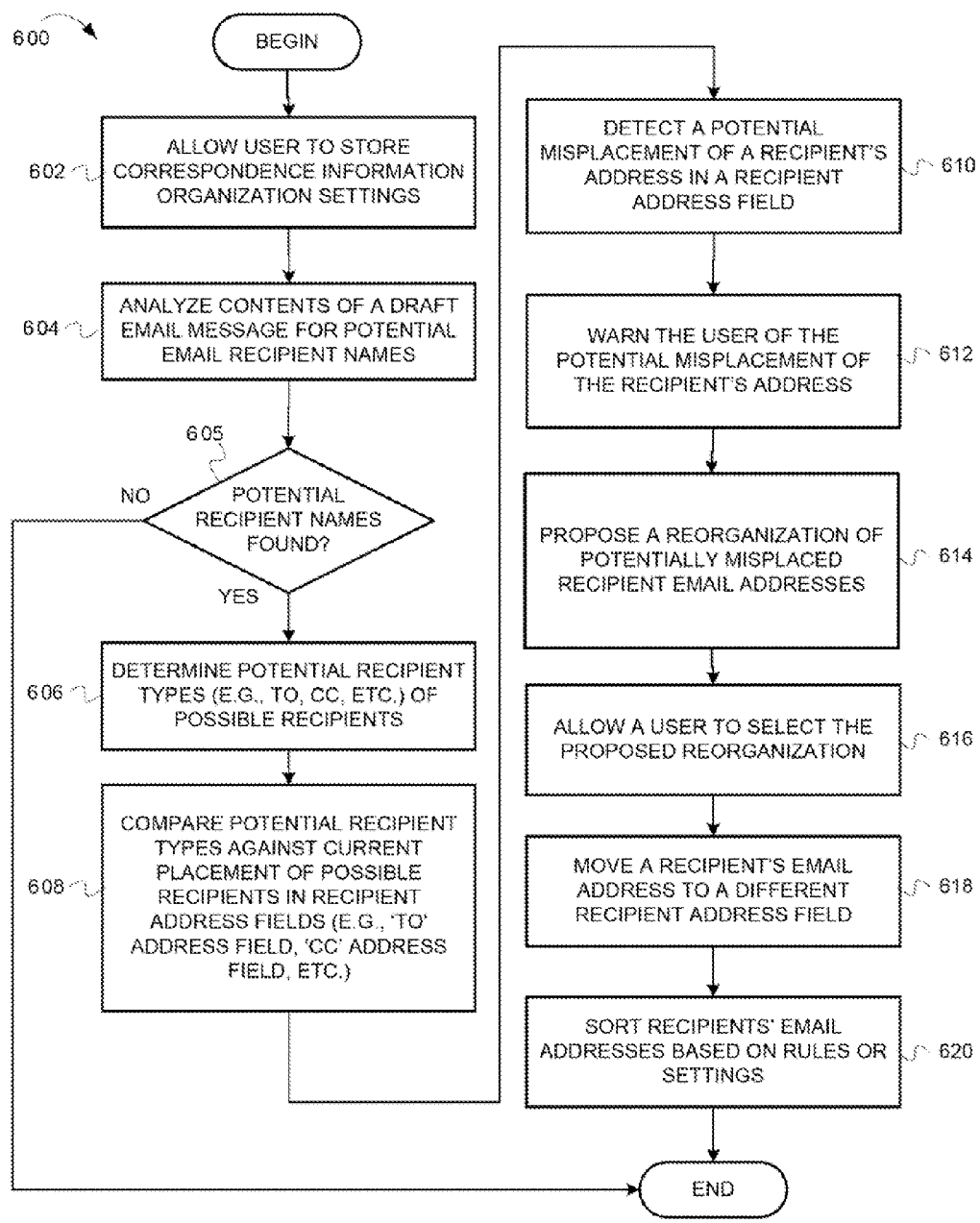
FIG. 6 is a flow diagram 600 illustrating organizing potentially misplaced email addresses based on email content, according to some embodiments of the invention.
Figure 7:
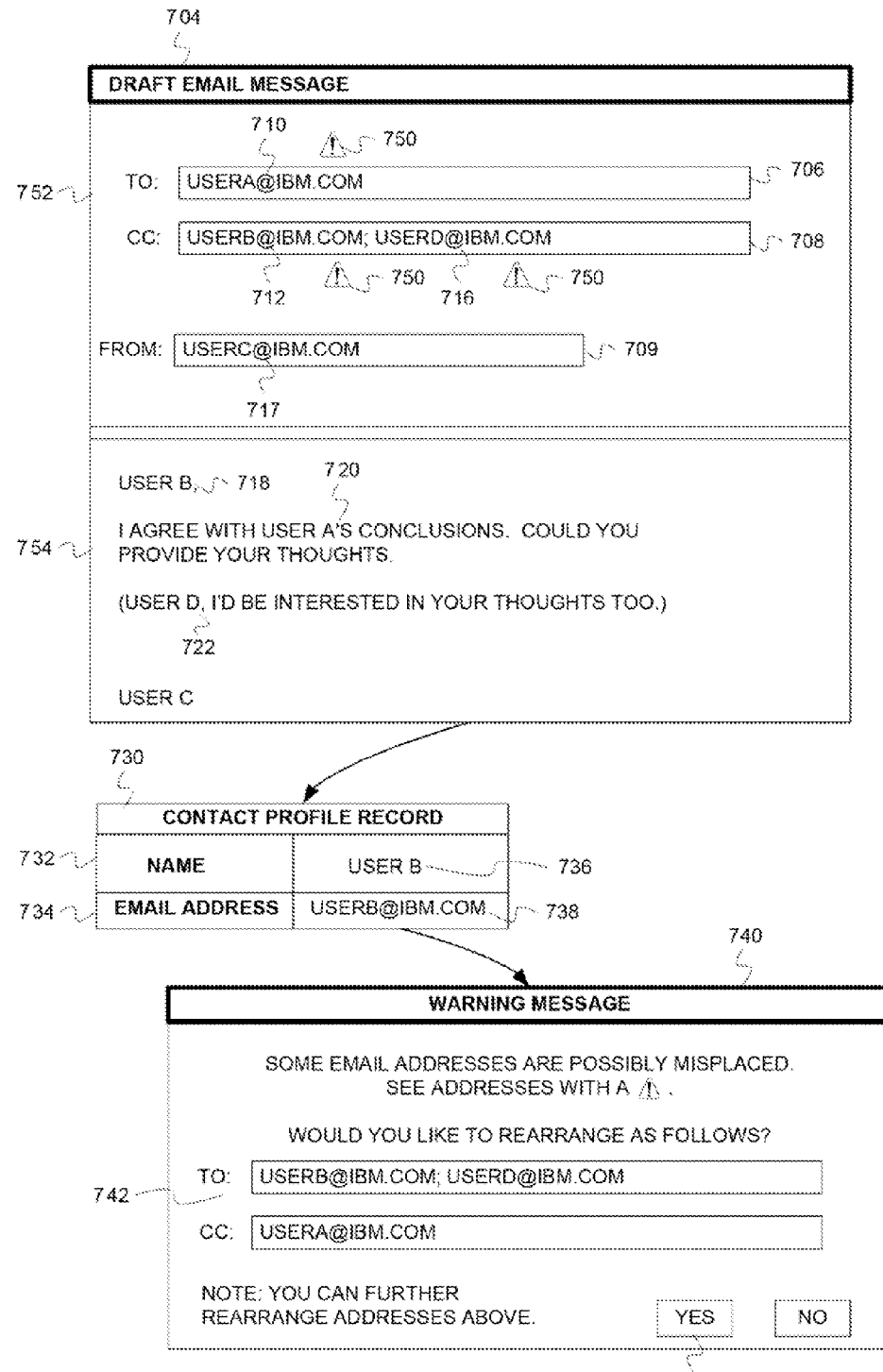
FIG. 7 illustrates an example draft email message 704, according to some embodiments of the invention.

FIG. 6 is a flow diagram illustrating organizing potentially misplaced email addresses based on email content, according to some embodiments of the invention. FIG. 7 illustrates an example draft email message, according to some embodiments of the invention. This description will present FIG. 6 in concert with FIG. 7. In FIG. 6, the flow 600 begins at processing block 602, where an email content analyzer device allows a user to store correspondence information organization settings. In some embodiments, a user settings store allows a user to store correspondence information organization settings. FIG. 4 above describes a user settings display that illustrates some of these settings according to some embodiments.

In FIG. 6, the flow 600 continues at processing block 604, where the email content analyzer device analyzes contents of an email message for possible intended recipient names. In FIG. 7, a draft email message 704 includes a correspondence header 752 and an email body 754. The correspondence header 752 can include a direct recipient email address field 706 ("direct recipient field"), a carbon-copy recipient email address field 708 ("carbon copy recipient field"), and a sender field 709. The direct recipient field 706 contains a direct draft recipient email address 710 for a direct draft recipient, "User A". The carbon-copy recipient field 708 contains a first carbon-copy draft recipient email address 712 for a first carbon-copy draft recipient, "User B" and a second carbon-copy draft recipient email address 716 for a second carbon-copy draft recipient, "User D". The sender field 709 contains a sender email address 717 for a sender, "User C". For exemplary purposes, it is presumed that the email addresses in the correspondence header 752 were automatically placed in the recipient fields 706, 708. For example, if User A had previously sent an email message that listed User C as a direct email recipient, and User B and User D as carbon-copy recipients, then User C may have used a "Reply to All" function to create the draft email message 704. The "Reply to All" function would have automatically placed User A's email address in the direct recipient field 706. Also, the "Reply to All" function would have automatically mirrored the carbon copy recipients of the original email sent by User A, and therefore would have placed User B's and User D's email addresses in the carbon-copy recipient field 708 of the draft email message 704.

On email messages, such as on the draft email message 704, a sender classifies recipients by types, either as a direct draft recipient type or a carbon-copy draft recipient type. The distinction is usually meant to indicate that the sender intends to address the email message directly to the direct draft email recipient, whereas the sender only intends to copy carbon-copy draft recipients for reference. However, the "Reply to All" function assumes that the recipient types do not change, and therefore copies recipient's email addresses to the exact same email address fields that matched those roles in the original email.

However, a sender that has utilized the "Reply to All" function may not think to change the types by moving email addresses from a direct recipient field 706 to a carbon-copy recipient field 708, or vice versa. More specifically, referring to FIG. 7, when the sender, User C, drafted the email body, User C actually intended the email to be directly sent to user B. Therefore, User C placed User B's name 718 in the greeting of the email body 754. In other words, User C intended User B to be a direct recipient type. Further, in the email body 754, User C addresses User D by name 722. Therefore, User C also intended User D to be a direct recipient type. On the other hand, User A is only referenced by name 720, not directly addressed. User C only intended User A to be a carbon-copy recipient type. However, because the "Reply to All" is a mechanical copy process, the email addresses are in the wrong fields. User A's email address is in the direct recipient field 706, while User B's and User D's email addresses are in the carbon-copy recipient field 708. If User C were to send the draft email message 704, the email would be sent with the email address recipients in their wrong email address fields. As a result, if User B or User D were to look at the email from an email application Inbox, User B or User D might see that they were carbon-copy type recipients, not direct type recipients, and therefore might ignore the email, or place it aside as less important. Therefore, the email content analyzer device finds the names of possible recipients in the email body 754. In some embodiments, to determine a possible intended recipient name, the email content analyzer device could look for capitalized words in the email body 754 and compare them to a list of possible proper names. Contrarily, the email content analyzer device could compare capitalized words in the email body 754 to a list of common words to exclude them as a possible intended recipient name. The email content analyzer device can also exclude certain common capitalized words from the analysis that are unlikely to be recipient names, such as salutations and greeting words like "Thanks", "Hi", etc.

In FIG. 6, the flow 600 continues at block 605. If no possible intended recipient names are mentioned or ascertainable in the email body 754, the process can end. Otherwise, if possible intended recipient names are found, the process continues.

In FIG. 6, the flow 600 continues at processing block 606, where the email content analyzer device determines potential intended recipient types of possible intended recipients. In FIG. 7, according to some embodiments, the email content analyzer device could look for intended recipient type indicators, based on the context of the possible intended recipient name within the email body. For example, the email content analyzer device could look for a punctuation mark that indicates a greeting (e.g., a comma, a colon, an ellipsis, etc.), where the punctuation mark immediately follows a potential intended recipient name. The email content analyzer device could also look for a hard return that follows the punctuation mark. The recipient type indicators help to indicate the types of possible intended recipients. For example, the email content analyzer device could find that User B and User D possibly have a direct recipient type because the names 718 and 722 are both capitalized words followed by commas. On the other hand, the email content analyzer device could find that User A possibly has a carbon-copy recipient type because the name 720 is not followed by any punctuation. In some embodiments, User A's name might not be included at all within the email content, and so User A might be assumed by default to be a carbon-copy recipient type. In some embodiments, some words in context like "All," or "Team," could indicate that all intended recipients are probably direct recipient types.

In FIG. 6, the flow 600 continues at processing block 608, where the email content analyzer device compares potential intended recipient types against the current placement of draft recipients email addresses in recipient address fields. Specifically, the email content analyzer device could look at the email addresses in the header 752. Draft email addresses in the direct recipient field 706 are direct draft recipient types. Draft email addresses in the carbon-copy recipient field 708 are carbon-copy draft recipient types. Those email addresses in the recipient fields 706, 708 might have contact record profiles stored within an email application database, address book, buddy list, etc. In FIG. 7, a contact profile record 730 includes a profile name field 732 and a profile email address field 734. The email content analyzer device can use an intended recipient name, like name 718, to search for a contact profile record that contains a matching name. In some embodiments, the email content analyzer device could search for actual names, nick names, short names, or any other such identifiers. Likewise, the email content analyzer device can use a draft email address, like 710, 712 or 716 to search for a contact profile record that contains a matching email address.

In FIG. 6, the flow 600 continues at processing block 610, where the email content analyzer device detects a potential misplacement of a recipient's address in a recipient address field. In FIG. 7, for example, if a contact profile record is found where an intended recipient name 718 matches the profile name 736, the email content analyzer device can then refer to the intended recipient type. Above, User B was determined to be a possible direct intended recipient. So, the email content analyzer device can look in the direct recipient field 706 for the profile email address 738 found in the profile record 730. If the profile email address 738 is in the direct recipient field 706, then the email content analyzer device would determine that the placement of the email addresses was probably correct. On the other hand, if the profile email address 738 matches an email address in the carbon-copy recipient field 708, such as the carbon-copy draft email address 712, and that same email address is not in the direct recipient field 706, then the placement of the email address is probably incorrect.

In FIG. 6, the flow 600 continues at processing block 612, where the email content analyzer device warns the user of the potential misplacement of a draft recipient's email address. In FIG. 7, the email content analyzer device displays a warning message 740. The warning message 740 may utilize user settings, such as those shown in FIG. 4, to determine warning indicators 750 that can be placed near draft email addresses, or in other places, like on an inbox display screen (not shown).

In FIG. 6, the flow 600 continues at processing block 614, where the email content analyzer device proposes a reorganization of potentially misplaced draft recipient email addresses. In FIG. 7, the email content analyzer device can propose a possible rearrangement 742 of potentially misplaced draft email addresses based on the determined intended recipient types.

In FIG. 6, the flow 600 continues at processing block 616, where the email content analyzer device allows a user to select the proposed reorganization. In FIG. 7, the email content analyzer device presents a button 744 that allows a user to accept the possible rearrangement 742 of potentially misplaced draft email addresses. Furthermore, the email content analyzer device could allow the user to manually rearrange draft email addresses within the possible rearrangement 742. Thus, the email content analyzer device allows the user to manually correct any possible mistakes in the possible rearrangement 742. Furthermore, in some embodiments, a user might manually place draft email addresses in the direct recipient field 706 or in the carbon-copy recipient field 708, either after selecting a "Reply to All" function, or in place of a "Reply to All" function. The email content analyzer device can monitor which draft email addresses were manually placed, and could ignore any possible rearrangements of manually placed draft email addresses and leave them in the fields that they were placed in.

In FIG. 6, the flow 600 continues at processing block 618, where the email content analyzer device moves a draft recipient's email address to a different recipient address field. In FIG. 7, if a user presses the button 744, an email recipient information organizer module rearranges the draft email address in the email recipient fields 706, 708 on the draft email message 704, to match those shown in the possible rearrangement 742.

In FIG. 6, the flow 600 continues at processing block 620, where the email content analyzer device sorts draft recipients email addresses based on rules or settings. In FIG. 7, the email content analyzer device could optionally sort the draft email addresses 710, 712, 716 in the direct recipient field 706 in the order of appearance of corresponding names of intended recipients within the email body 756 (i.e., User B's email address before User D's email address.) The sorting option could be part of a user setting, as shown in FIG. 4 above.

Figure 8:
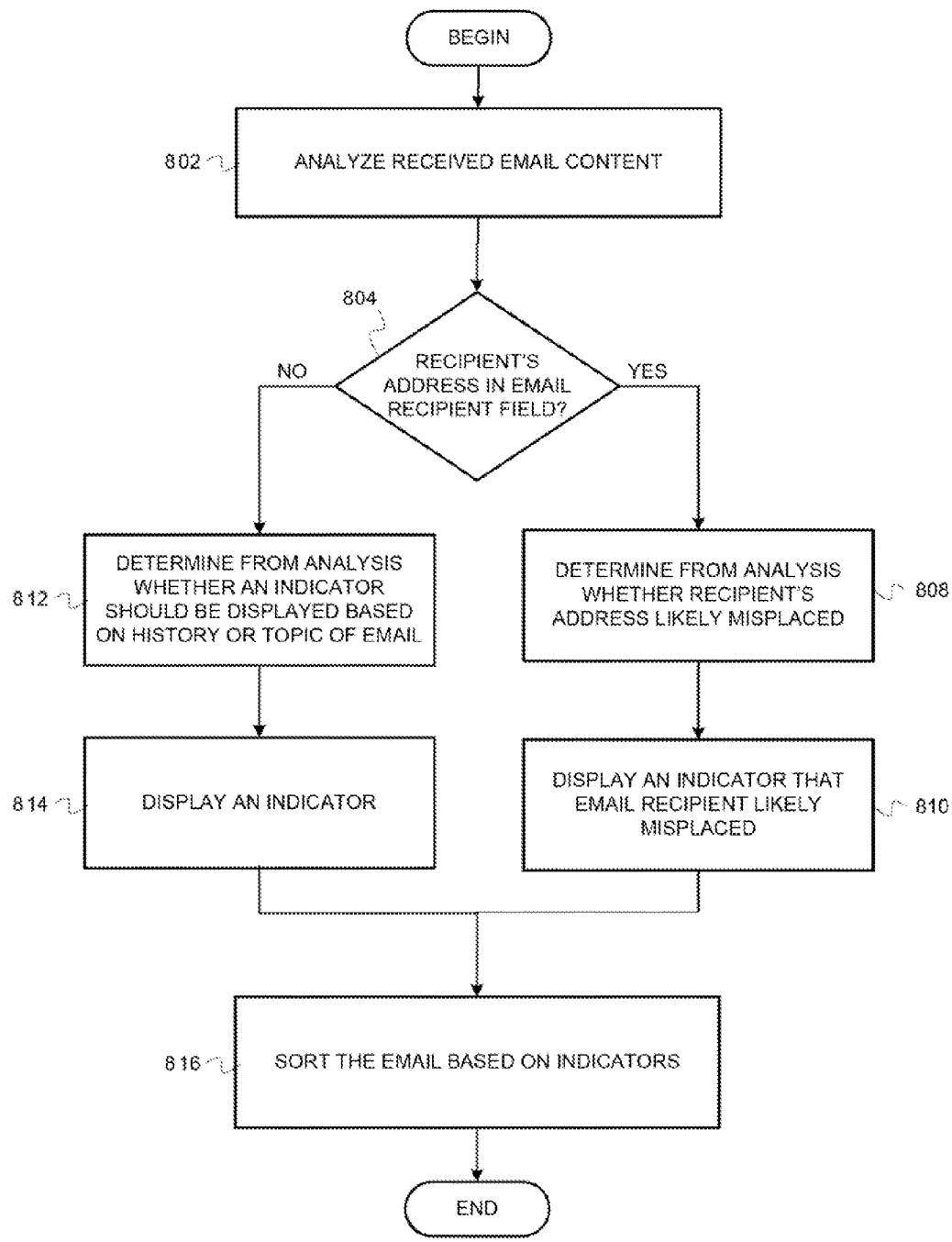
FIG. 8 is a flow diagram 800 illustrating displaying indicators based on email content, according to some embodiments of the invention.
Figure 9:
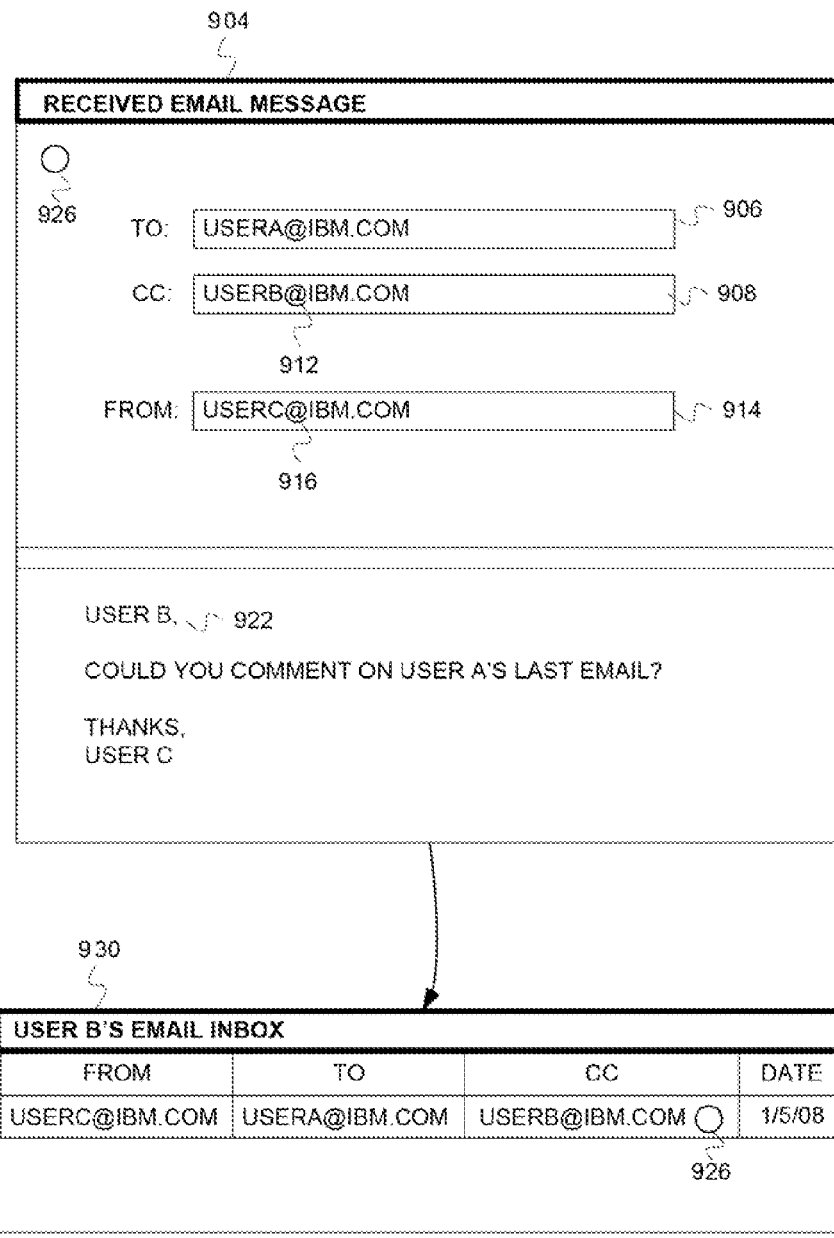
FIG. 9 illustrates an example received email message 904, according to some embodiments of the invention.

FIG. 8 is a flow diagram illustrating displaying indicators based on email content, according to some embodiments of the invention. FIG. 9 illustrates an example received email message, according to some embodiments of the invention. This description will present FIG. 8 in concert with FIG. 9 and FIG. 10. In FIG. 8, the flow 800 begins at processing block 802, where an email content analyzer device analyzes received email content. Analyzing email content could include scanning the body, history, subject line, recipient and sender fields, originating sender, etc. of an email message to determine names of potential intended email recipients. In FIG. 9, the email content analyzer device can look names of potential intended recipients, such as name 922. The email content analyzer device can also determine potential intended recipient types based on the context of the names in the email message. For example, because name 922, for User B, appears to be in a greeting line of the email message, User B is probably a direct intended recipient type as opposed to a carbon-copy intended recipient type.

In FIG. 8, the flow 800 continues at block 804, where the email content analyzer device determines whether the intended recipient's address is in an email recipient field. In FIG. 9, the User B's email address is in the carbon-copy recipient field 908, not the direct recipient field 906.

In FIG. 8, the flow 800 continues at processing block 808, where the email content analyzer device determines from analysis whether a recipient's email address is likely misplaced. In FIG. 9, User B's email address 912 is in a carbon-copy recipient field 908. However, the email content analyzer device can determine from the context of the name 922 in the email message that User B is a potential direct recipient type. Therefore, User B's email address should likely have been in the direct recipient field 906.

In FIG. 8, the flow 800 continues at processing block 810, where the email content analyzer device displays an indicator that the email recipient's email address has been misplaced.

In FIG. 9, the email content analyzer device can display the indicator 926 on the email message and in other places, like on an email inbox 930.

Figure 10:
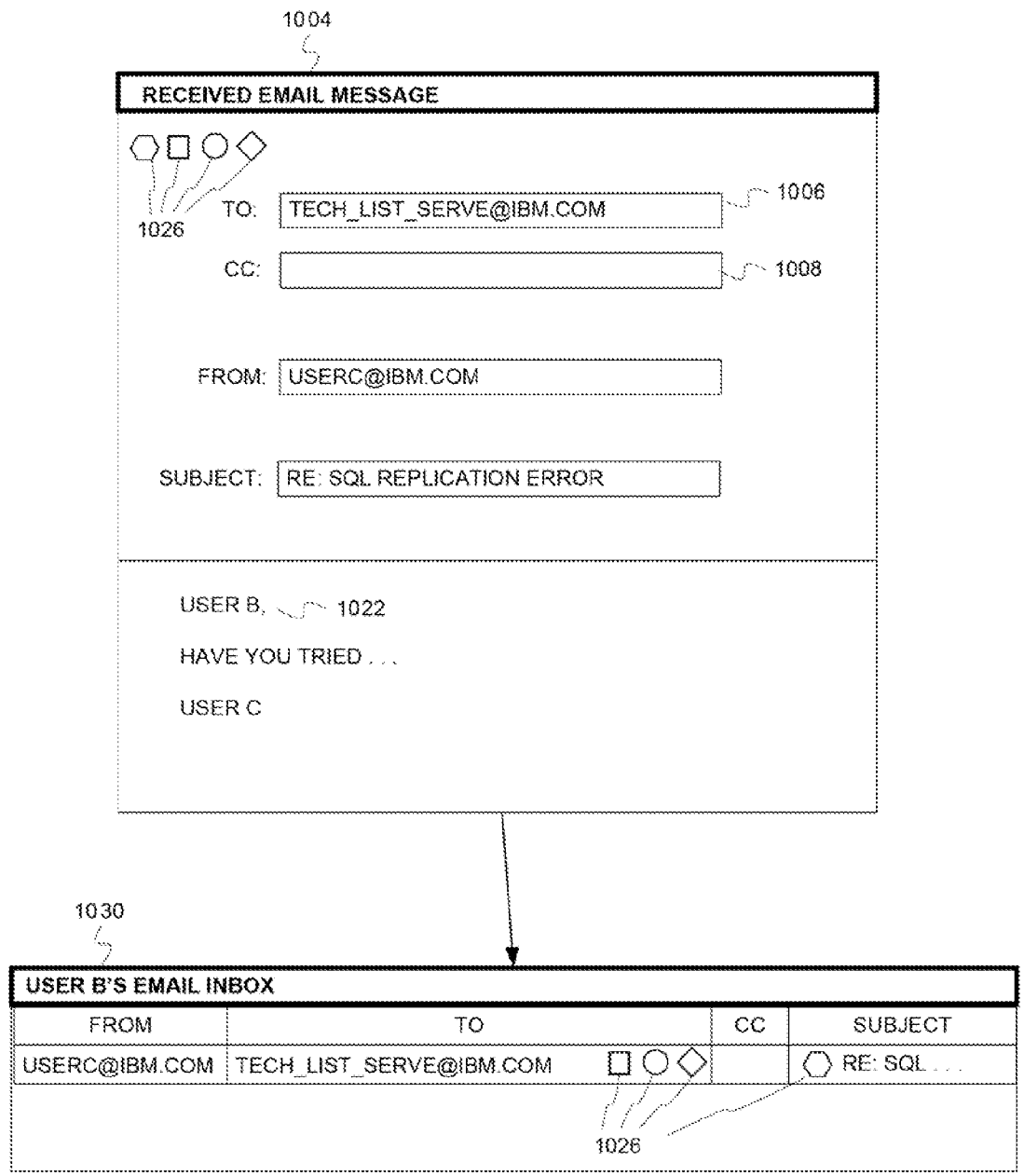
FIG. 10 illustrates an example received email message 1004, according to some embodiments of the invention.

In FIG. 8, if the recipient's email address is not found in a recipient field, the flow 800 continues at processing block 812, where the email content analyzer device determines from analysis whether an indicator should be displayed based on other content, such as history or topic of email. In FIG. 10, a sender, User C, sends an email message to an email list. User C intends User B to be a direct recipient type, as indicated by the name 1022 in context of the email message. User B receives the email message because User B is a member of the list. However, the email message may not include User B's email address in either the direct recipient field 1006 or the carbon-copy recipient field 1008.

In FIG. 8, the flow 800 continues at processing block 814, where the email content analyzer device displays an indicator. In FIG. 10, the email content analyzer device displays indicators 1026 that relate to user settings, such as settings described in FIG. 4 above. Tile email content analyzer device can display the indicators 1026 on the email message and in other places, like on an email inbox 1030.

In FIG. 8, the flow 800 continues at processing block 816, where the email content analyzer device sorts the email based on indicators. In some embodiments, a correspondence display module sorts the email based on indicators.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:
   prior to transmission of an electronic mail message, determining that a first indication of an intended recipient occurs in content of the electronic mail message while analyzing the electronic mail message, wherein a second indication of the intended recipient occurs in a first type of recipient address field of the electronic mail message;
   analyzing a context of the first indication of the intended recipient within the content of the electronic mail message wherein said analyzing the context of the first indication of the intended recipient within the content of the electronic mail message comprises determining at least one of a location of the first indication of the intended recipient within the content and punctuation in relation to the first indication of the intended recipient;
   determining that the intended recipient is of a first recipient type of a plurality of recipient types with respect to the electronic mail message based, at least in part, on said analyzing the context of the first indication within the content of the electronic mail message, wherein the first recipient type corresponds to a second type of recipient address field of the electronic mail message and a second recipient type of the plurality of recipient types corresponds to the first type of recipient address field;

determining that the second indication of the intended recipient is incorrectly placed in the first type of recipient address field based on the determining that the intended recipient is of the first recipient type; and moving the second indication of the intended recipient from the first type of recipient address field to the second type of recipient address field in response to determining that the second indication of the intended recipient is incorrectly placed in the first type of recipient address field.

2. The method of claim 1, further comprising displaying a warning indicator graphic that indicates the moving of the second indication of the intended recipient from the first type of recipient address field to the second type of recipient address field.

3. The method of claim 1, wherein said determining the punctuation in relation to the first indication of the intended recipient comprises:

determining a type of punctuation adjacent to the first indication of the intended recipient immediately followed by a hard return.

4. The method of claim 1, wherein said determining the location of the first indication of the intended recipient within the content of the electronic mail message comprises determining whether the first indication of the intended recipient is in a greeting line.

5. A method comprising:

generating a draft email that includes email recipient fields of a plurality of recipient types that comprise a first recipient type and a second recipient type;

scanning email content that is in parts of the draft email that are other than the email recipient fields;

finding at least one contact identifier in the email content, wherein the at least one contact identifier identifies a potential contact recipient of the draft email, and wherein the potential contact recipient is not a sender of the draft email;

analyzing the at least one contact identifier in context of the email content, wherein said analyzing comprises determining at least one of a type of punctuation mark that indicates a greeting in relation to the at least one contact identifier, a type of punctuation mark that immediately follows the at least one contact identifier, a type of punctuation mark adjacent to the at least one contact identifier immediately followed by a hard return, and whether the at least one contact identifier is located in a greeting line of the email content;

determining, based on the analysis of the at least one contact identifier in the context of the email content, an intended recipient role for the potential contact recipient as that corresponding to the first recipient type;

selecting at least one email address for the potential contact recipient from one of the email recipient fields that corresponds to the second recipient type; and determining, based on the determining that the intended recipient role for the potential contact recipient corresponds to the first recipient type, that the at least one email address is incorrectly placed in the one of the email recipient fields that corresponds to the second recipient type.

6. The method of claim 5 wherein analyzing the at least one contact identifier in context of the email content comprises:

determining a name of the potential contact recipient within a body of the draft email;

analyzing the name within context of the body of the draft email; and determining the intended recipient role based on the context of the name within the body of the draft email.

7. The method of claim 6 further comprising:

searching contact profile records;

finding a matching profile with a profile name that matches the name of the potential contact recipient;

ascertaining the at least one email address from the matching profile;

determining that the at least one email address is incorrectly placed in the one of the email recipient fields in response to determining that the first recipient type matches the intended recipient role for the potential contact recipient; and displaying a warning indicator graphic to indicate that the at least one email address is incorrectly placed in the one of the email recipient fields.

8. The method of claim 5 further comprising:

proposing a possible reorganization of the at least one email address into another of the email recipient fields that corresponds to the first recipient type, which the first recipient type matches the intended recipient role for the potential contact recipient.

9. The method of claim 5 further comprising:

placing the at least one email address into another of the email recipient fields that corresponds to the first recipient type, which the first recipient type matches the intended recipient role for the potential contact recipient.

10. A system comprising:

a processor unit;

a bus coupled with the processor;

a network interface coupled with the bus;

an email content analyzer module configured to generate a draft email, wherein generation of the draft email automatically places a plurality of email addresses into email recipient fields, wherein the email recipient fields comprise a first recipient type and a second recipient field, select at least one email address of the plurality of email addresses from one of the email recipient fields that corresponds to the first recipient type, determine a name of a contact related to the at least one email address, scan an email body of the draft email to find the name in the email body, analyze the name in the context of the email body to determine at least one of a type of punctuation mark that indicates a greeting in relation to the name within the email body, a type of punctuation mark that immediately follows the name, a type of punctuation mark adjacent to the name and immediately followed by a hard return, and whether the name is located in a greeting line of the email body, determine, based on the analysis of the name in the context of the email body, an intended recipient role for the contact, wherein the intended recipient role corresponds to the second recipient type, and determine, based on determination that the intended recipient role for the contact corresponds to the second recipient type, that the at least one email address is incorrectly placed in the one of the email recipient fields that corresponds to the first recipient type; and a correspondence display module configured to
select a warning indicator graphic, based on a preference setting in a profile for a sender of the draft email, and
present the warning indicator graphic based on the determination that the at least one email address is incorrectly placed in the one of the email recipient fields that corresponds to the first recipient type.

11. The system of claim 10, wherein the email content analyzer module is further configured to
determine that the intended recipient role for the potential contact recipient is not a role that corresponds to the first recipient type, and
determine that the at least one email address is not in another one of the email recipient fields that corresponds to the second recipient type.

12. The system of claim 10 further comprising: an email recipient information organizer module configured to
move the at least one email address from the one of the email recipient fields that corresponds to the first recipient type to another one of the email recipient fields that corresponds to the second recipient type.

13. The system of claim 10, wherein the email content analyzer module is further configured to assign the intended recipient role based on whether the name is in a greeting line in the email body.

14. The system of claim 10, wherein the email content analyzer module is further configured to
determine that the intended recipient role for the potential contact recipient is a direct recipient role,
determine that the at least one email address is not positioned in a direct recipient field, and
indicate that the at least one email address is not positioned in the direct recipient field.

15. A computer program product comprising:
a machine-readable medium consisting of one of more of a computer memory, a random access memory, a hard disk, a digital versatile disk, a basic input/output system read-only memory, a synchronous dynamic random-access memory, and an extended data output random-access memory, said machine-readable medium having machine-readable program code embodied therewith for analyzing email content to determine intended email recipients, said machine-readable program code comprising:
machine-readable program code configured to
generate a draft email that includes at least one direct recipient field and at least one copy recipient field,
scan an email body of the draft email to find a name of a contact in the email body, wherein the name is not for a sender of the draft email,
analyze the name in the context of the email body to determine at least one of a type of punctuation mark that indicates a greeting in relation to the name within the email body, a type of punctuation mark that immediately follows the name, a type of punctuation mark adjacent to the name and immediately followed by a hard return, and whether the name is located in a greeting line of the email body,
determine, based on the analysis of the name in the context of the email body, an intended recipient role for the contact as an intended direct recipient of the draft email and not an intended copy recipient,
determine that an email address associated with the contact is incorrectly placed in the copy recipient field instead of in the direct recipient field based on determination that the intended recipient role for the contact is as an intended direct recipient, and
move the email address from the copy recipient field to the direct recipient field in response to determination that the email address is incorrectly placed in the copy recipient field.

16. The computer program product of claim 15 further comprising: machine-readable program code configured to
automatically place the email address in the copy recipient field upon generation of the draft email based on placement of the email address in an additional copy recipient field of a received email.

17. The computer program product of claim 15, further comprising:
machine-readable program code configured to analyze the context of the name in a history of previously sent email messages within the email body, and
determine that the intended recipient role for the contact is the intended direct recipient based on the analyzed history.

18. The computer program product of claim 15 further comprising: machine-readable program code configured to
display a pre-configured, warning indicator graphic, that was custom selected and stored via a user profile associated with the sender of the draft email, wherein the pre-configured, warning indicator graphic is configured to indicate that the email address is not positioned in the direct recipient field.

19. The method of claim 1, wherein the punctuation in relation to the first indication of the intended recipient is one or more of a comma, a colon, and an ellipsis, adjacent to the first indication of the intended recipient, followed immediately by a hard return.

20. The method of claim 10, wherein the type of punctuation mark is one or more of a comma, a colon, and an ellipsis.

* * * * *